United States Patent
Oross et al.

(10) Patent No.: US 7,059,732 B2
(45) Date of Patent: Jun. 13, 2006

(54) PORTABLE PROJECTOR SYSTEM

(75) Inventors: Glen A. Oross, Corvallis, OR (US);
Peter Guy Howard, Junction City, OR (US); Michael A. Pate, Tuscon, AZ (US); David L Smith, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 101 days.

(21) Appl. No.: 10/723,235

(22) Filed: Nov. 26, 2003

(65) Prior Publication Data

US 2005/0110961 A1  May 26, 2005

(51) Int. Cl.
*G03B 21/14* (2006.01)
*G03B 21/30* (2006.01)

(52) U.S. Cl. .................................... 353/119
(58) Field of Classification Search ............... 353/119, 353/52, 60, 61; 348/787–789, 836, 843; 349/7, 56–58
See application file for complete search history.

(56) References Cited

U.S. PATENT DOCUMENTS

| | | | |
|---|---|---|---|
| 4,696,557 A * | 9/1987 | Tomizuka | 353/66 |
| 4,721,380 A | 1/1988 | Gryglas | |
| 5,343,262 A | 8/1994 | Park | |
| 5,416,541 A | 5/1995 | Fog | |
| 5,630,659 A * | 5/1997 | Ronzani et al. | 353/15 |
| 5,663,762 A * | 9/1997 | Nishiyama | 348/373 |
| 5,820,242 A * | 10/1998 | Rodriguez et al. | 353/119 |
| 5,829,858 A * | 11/1998 | Levis et al. | 353/122 |
| 5,868,484 A | 2/1999 | Chikauchi et al. | |
| 5,876,105 A * | 3/1999 | Rodriquez, Jr. | 353/119 |
| 6,334,687 B1 * | 1/2002 | Chino et al. | 353/79 |
| 6,609,798 B1 * | 8/2003 | Milinusic et al. | 353/98 |
| 6,637,896 B1 * | 10/2003 | Li et al. | 353/119 |
| 2004/0141155 A1 * | 7/2004 | Wang et al. | 353/61 |

FOREIGN PATENT DOCUMENTS

| | | |
|---|---|---|
| JP | 05224300 | 9/1993 |
| JP | 08043943 | 2/1996 |

* cited by examiner

Primary Examiner—W. B. Perkey
Assistant Examiner—Andrew Sever

(57) ABSTRACT

An image projection system is provided that includes a portable projector, where the projector includes a light engine, and a projector housing having a closed configuration and an open configuration, where in the closed configuration the projector housing at least partially encloses the light engine, and in the open configuration the projector housing supports the light engine.

41 Claims, 6 Drawing Sheets

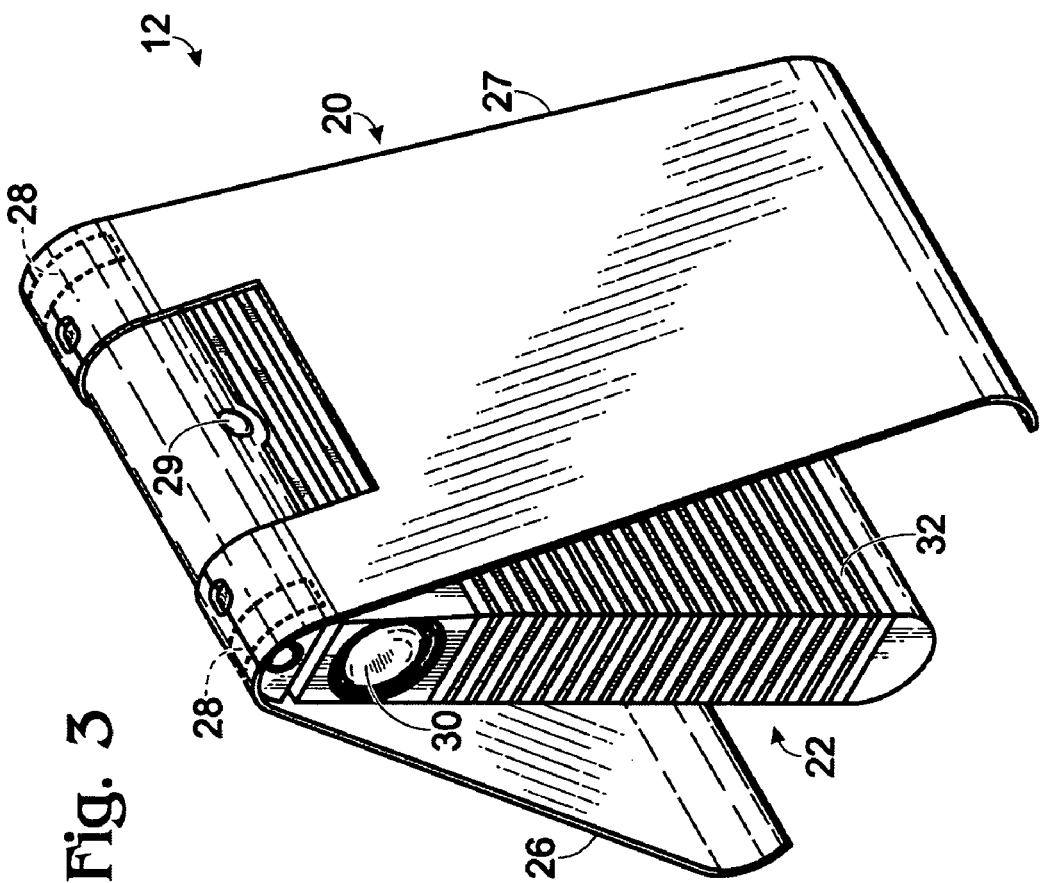
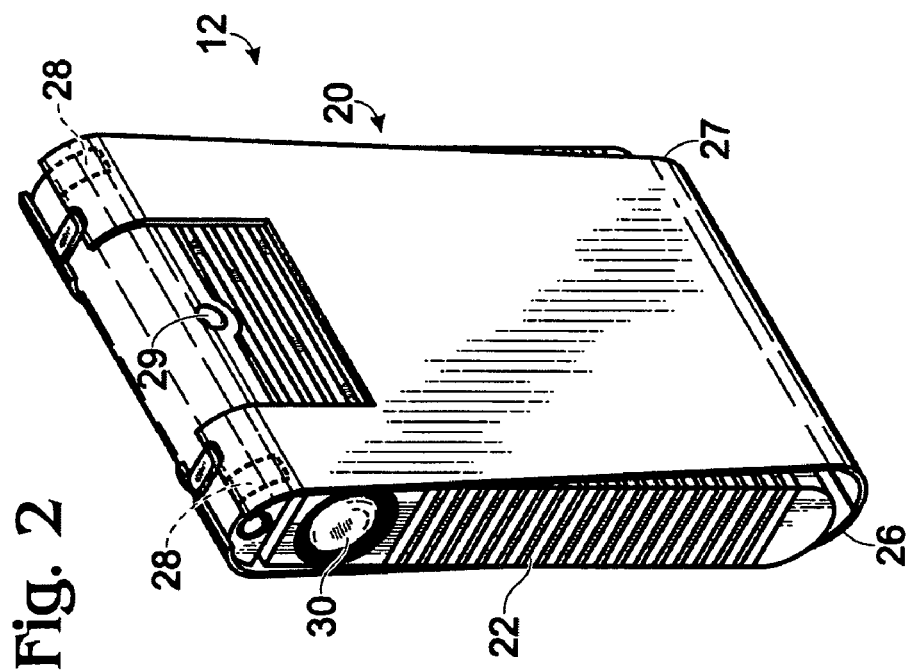

PORTABLE PROJECTOR SYSTEM

BACKGROUND

Image projection systems may be used to display a still or video image, or to enable the image to be viewed simultaneously by a large or small audience. Such projection systems have become increasingly popular, particularly where they are appropriately sized for use on a table top and may be easily carried by a user. There is, however, a continuing demand for ever smaller devices that may be conveniently transported and stored. In particular, there is a demand for digital projectors that may be no larger than a laptop computer, but that offer the performance of a conventional projector. Such a projector would not only offer increased portability, but could be sized appropriately to fit in a case designed for a laptop computer.

SUMMARY

An image projection system is provided that includes a portable projector, where the projector includes a light engine, and a projector housing having a closed configuration and an open configuration. In the closed configuration, the projector housing at least partially encloses the light engine, and in the open configuration, the projector housing supports the light engine.

BRIEF DESCRIPTION OF THE DRAWINGS

FIG. 2 depicts a portable projector according to an embodiment of the invention in a closed configuration.

FIG. 3 depicts the portable projector of FIG. 2 in an open configuration.

DETAILED DESCRIPTION

Figure 1:
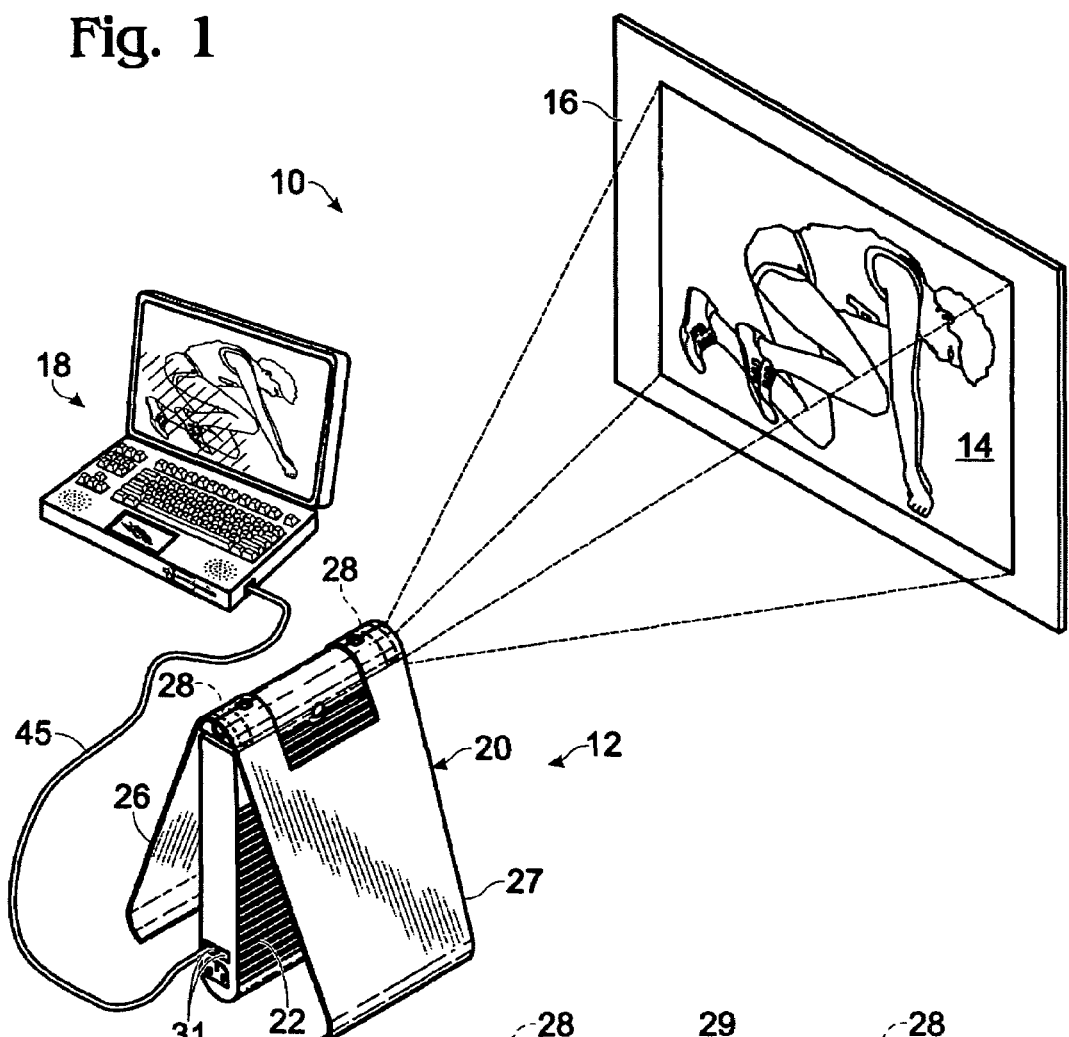
FIG. 1 depicts a portable projector system according to an embodiment of the invention.
Figure 4:
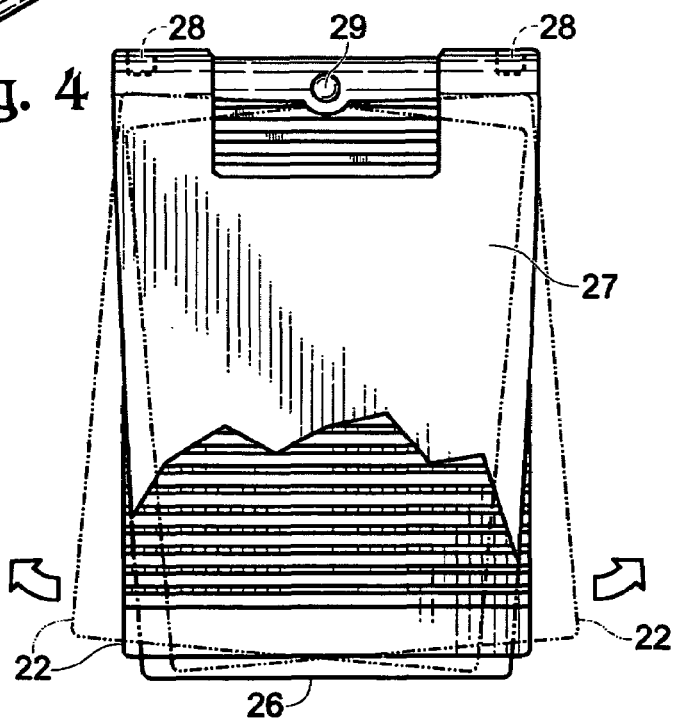
FIG. 4 is a partial cutaway side view of the portable projector of FIG. 3.

Referring initially to FIG. 1, an image projection system according to an embodiment of the present invention is shown at 10. Projection system 10 may include a portable projector 12, adapted to produce an image 14 on a display surface 16. Projector 12 may be associated with an image data source 18, depicted in FIG. 1 as a laptop computer. Projector 12 thus may be configured to project an image 14 derived from the image data received from computer 18 onto display surface 16.

The projector may take the form of a digital projector, or another suitable projection device. Projector 12 may include a projector housing 20 and a light engine housing 22 that includes a light engine. The projector housing may have a closed configuration, as shown in FIG. 2, and an open configuration, as shown in FIGS. 1 and 3. In its closed configuration, projector housing 20 at least partially encloses the light engine housing (and therefore the light engine). In particular, as shown in FIG. 3, projector housing 20 is shown in the open configuration, in which a first portion 26 of the housing, and a second portion 27 of the housing, form a clamshell that is pivotally connected at hinges 28, such that rotating the pivotal connection, that is opening the hinge, converts the closed configuration of the projector housing to the open configuration of the projector housing. In the open configuration, first portion 26 and second portion 27 function as a stand for the projector, and support the light engine housing in such a manner that the light engine is capable of projecting an image.

As shown in FIGS. 1–3, light engine housing 22 is supported by projector housing 20 at pivotal connection 29, so that the light engine housing depends from the stand formed by first portion 26 and second portion 27. Projector 12 may include a projection lens 30, disposed for example adjacent the top of the light engine housing as shown in FIGS. 2 and 3. The presence of pivotal connection 29 permits the light engine housing to be tilted in order to facilitate directing a projected image from projection lens 30 to the desired display surface. Light engine housing 22 may also include one or more ports 31, that are configured for data communication or connection to a power supply.

As light engine 24 may produce significant amounts of heat during operation, the projector may include active or passive cooling for the light engine. For example, the light engine housing 22 may incorporate one or more vents 32 that permit heat to escape. Such cooling may be assisted by the action of one or more cooling fans, or may rely upon convective cooling. The projector may be configured so that opening the projector housing, and thereby deploying the light engine, enhances cooling. For example, as shown in FIG. 3, opening the projector housing may provide increased access to cooling vents 32, thereby enhancing cooling.

Figure 5:
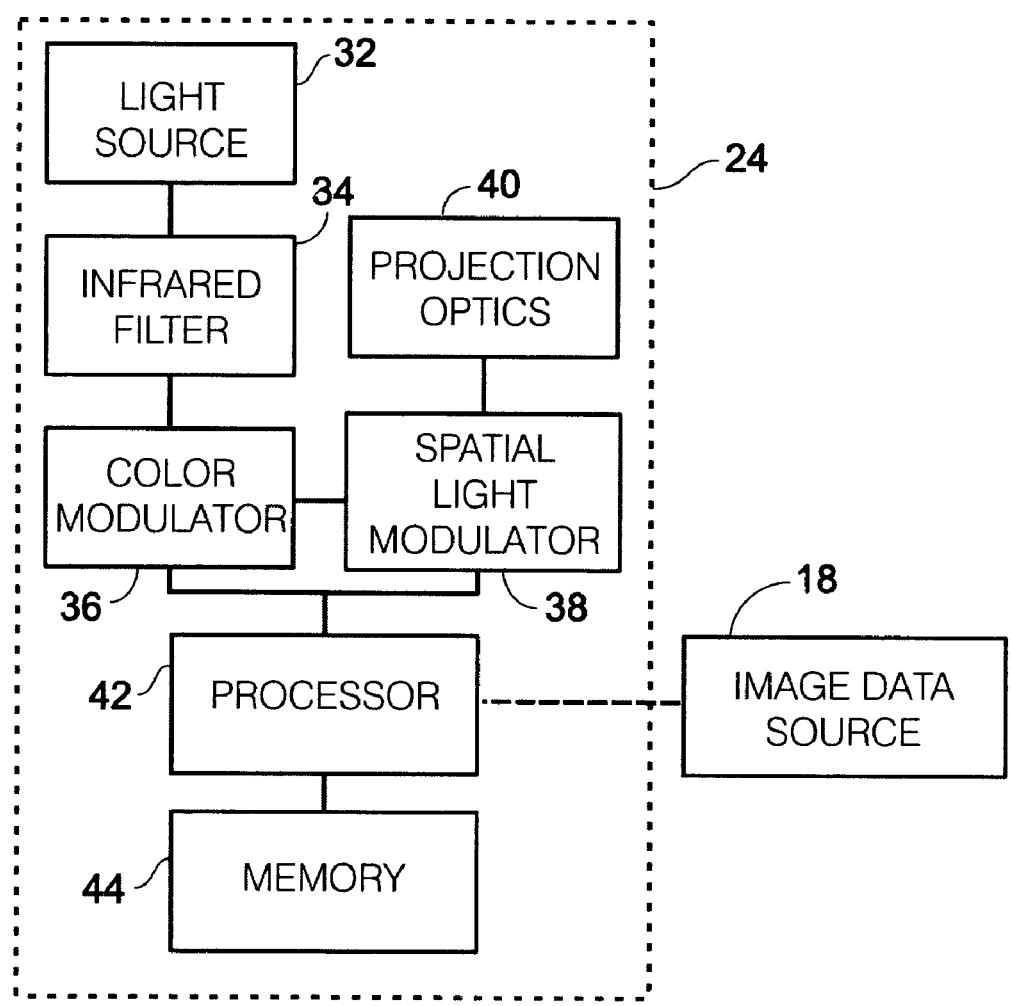
FIG. 5 is a schematic depiction of the light engine of a portable projector according to an embodiment of the invention.

The light engine housing includes a light engine 24 that is typically configured to direct and transmit light to display surface 16. For example, as shown schematically in FIG. 5, light engine 24 may include a light source 32, infrared filter 34, a color modulator 36, a spatial light modulator 38, and projection optics 40. Additionally, light engine 24 may include additional optics, spatial light modulators, scanning mirrors, focusing devices, color-generation devices, controllers, etc. which may accommodate production of a multi-color image on the display surface. The images projected by the image projector may include still images or video images. Both still and video images will be referred to herein simply as projected images.

Light source 32 may include any suitable illumination source adapted to optically address display surface 16. Light source 32 may include a broad spectrum light source, a full spectrum light source, or a white light source. Selected appropriate light sources may include one or more of, among others, metal halide lamps, xenon lamps, halogen lamps, mercury vapor lamps, plasma lamps, incandescent lamps, light-emitting diodes (LEDs), and laser diodes.

Color modulator 36 may be configured to receive multispectral light generated by light source 12, and separate it into multiple bands based on the wavelength of the light. That is, the broad spectrum light from the light source may be separated into multiple distinct beams of light that are physically separated in space, where each beam includes light that is part of a more narrow range of wavelengths than that produced by the multispectral light source. Although many digital projectors may use a spinning color filter wheel to perform the color separation, a less mechanically complex and lighter may involve either prisms or multiple dichroic mirrors to effect the desired chromatic separation.

Spatial light modulator 38 may include any device or apparatus configured to receive the chromatically separated light from the color light modulator and form an image by selectively manipulating the light. For example, the image-forming element may include a transmissive image-forming element, such as a liquid crystal display panel (LCD), among others. Alternatively, the image-forming element may function as a reflective image-forming element, such as digital micromirror device (DMD), a grating light valve (GLV), or liquid crystal on silicon (LCOS), among others.

The light engine may further include a processor 42 that is configured to receive the image data from image data source 18 and to convert the image data into the desired projected image. Processor 42 may be in communication with a memory 44 that serves as temporary (or long term) storage of data such as calibration information, color information, and other data needed by processor 42 to operate projector 12.

The image data source 18 may be, without limitation, a personal computer, such as a notebook computer, a personal digital assistant, or a mainframe computer such as a file server. The data connection 45 between the image data source and the projector processor may include a hardwire connection, or may be a wireless data connection. Where the data connection is a hardwire connection, the hardwire connection may be a cable, in a local area network or a large area network. Alternatively, the data connection may include a wireless connection that utilizes modulated radiation, typically an infrared or rf (radio frequency) signal. Alternatively, projector 12 may create the projected image from image data stored internally by the projector, for example, using memory 44, so that connection to an external data source is unnecessary. Similarly, projector 12 may include a disk drive or other auxiliary memory device, enabling image data to be received by processor 42 directly.

The elements of light engine 24 may be constructed so as to minimize the size and weight of the resulting projector. For example, rather than employing refractive optical elements, the light engine may employ reflective optics, such as utilizing thin, front-surfaced mirrors as focusing elements, rather than thick and heavy lenses. Alternatively, refractive optics may be utilized that are composed of relatively light-weight polymers rather than glass or quartz, provided that the polymer used exhibits the requisite optical properties.

Figure 6:
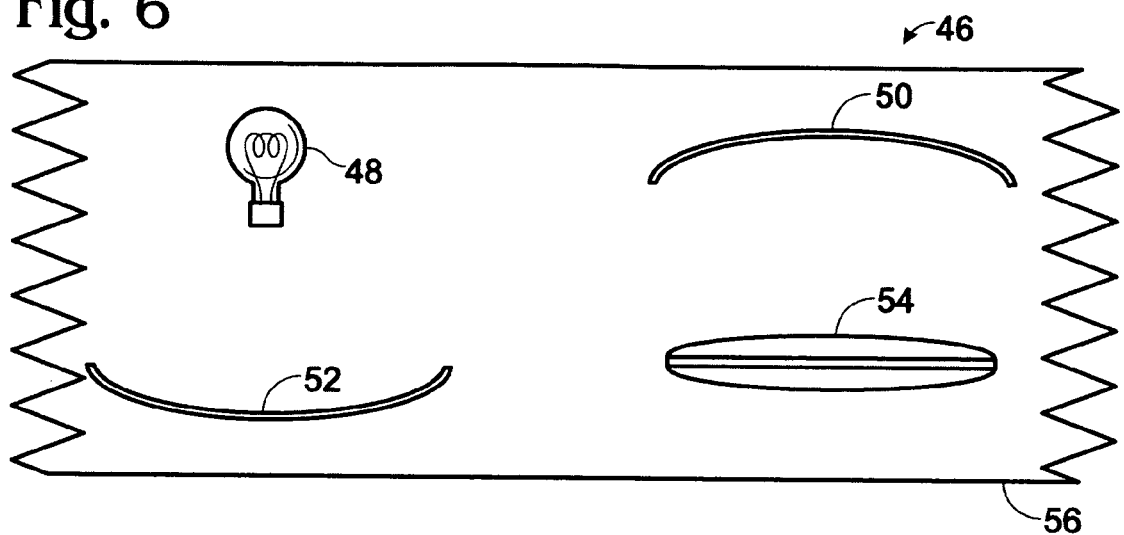
FIG. 6 is a semi-schematic depiction of a light engine in a compact state, according to an embodiment of the invention.
Figure 7:
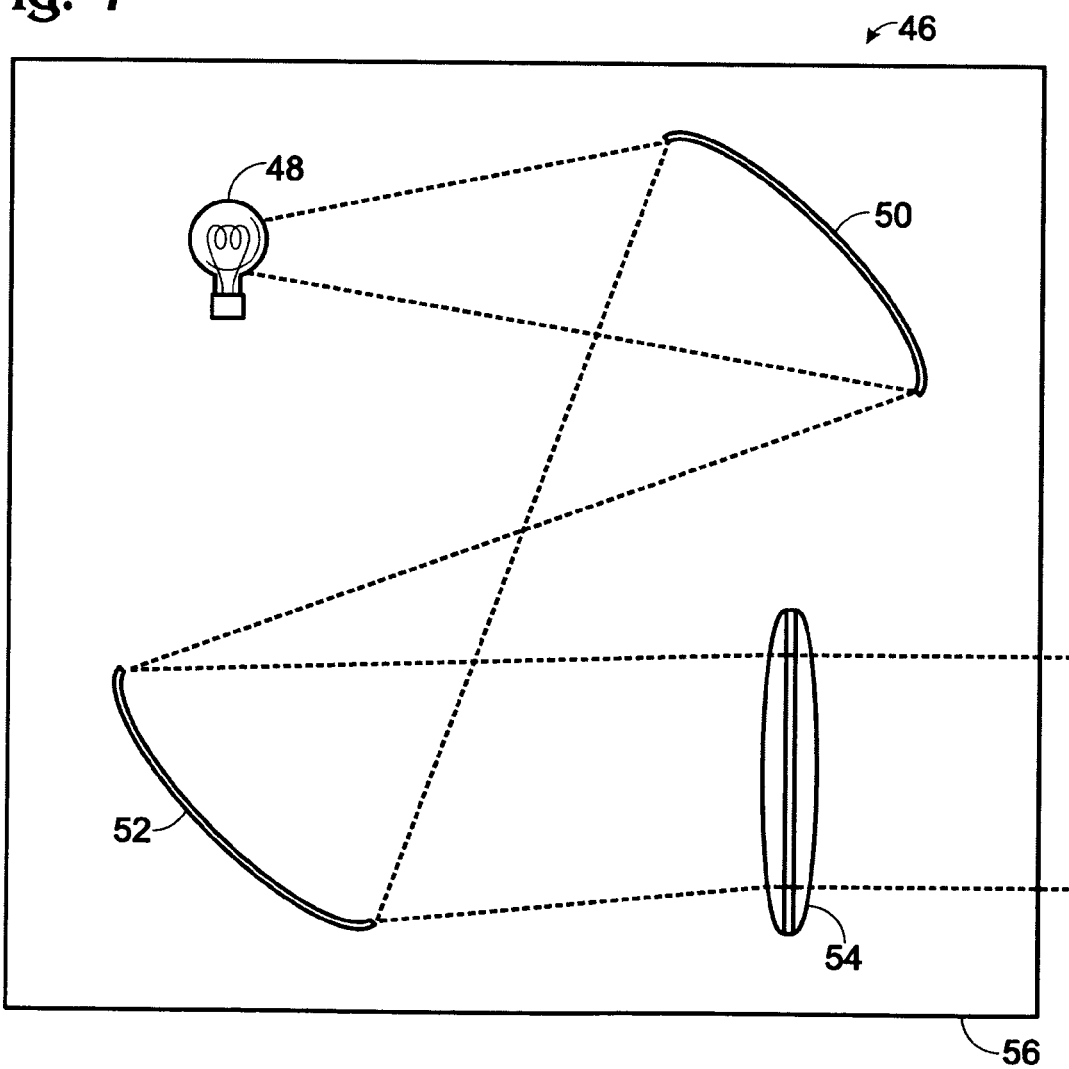
FIG. 7 is a semi-schematic depiction of the light engine of FIG. 6 in an expanded state.

Alternatively, or in addition to the use of light weight components, the light engine itself may be constructed so as to exhibit two physical configurations that correspond to a compact state and an expanded state. For example, as shown schematically in FIG. 6, a light engine 46 may include a light source 48, reflective optical elements 50 and 52, and projection optics 54, enclosed by a housing 56. In its compact configuration, light engine 46 is inoperative, as optical elements 50, 52, and 54 are stored in an inappropriate position for image formation and projection. However when the light engine is deployed in its expanded state, as shown schematically in FIG. 7, the optical elements may be rotated into their appropriate positions to generate and/or project the desired image, rendering the light engine operative. It should be understood that a variety of engineering solutions may exist for minimizing the size and weight of the light engine when in the compact state that are compatible with the present disclosure.

The projectors described herein may be constructed so that the projector housing opens to form an upright stand, as shown in FIG. 3, from which the light engine housing depends. However, the projector may be constructed so that the light engine housing remains connected to either the first or second portion of the projector housing, or both, when the projector housing is in its open configuration. This may be advantageous where the projector is constructed so that when the projector housing is in a closed configuration the light engine is stored in a compact state, and when the projector housing is in an open configuration the light engine is deployed in its expanded state. Such a light engine may be inoperative in the compact state, and operative in the expanded state.

Figure 8:
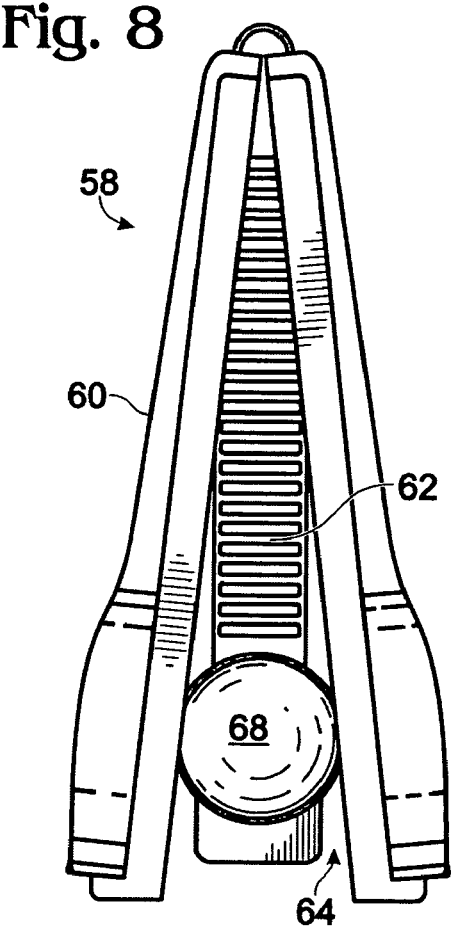
FIG. 8 depicts a portable projector according to an alternative embodiment of the invention in an open configuration.

For example as shown in FIG. 8 a portable projector 58 may be constructed so that the projector housing is coupled to the light engine housing. Upon opening projector housing 60, an expansive force may be exerted upon the light engine housing 62, resulting in the deployment of the light engine in an expanded state. The expansion may principally occur in a space 64 between the projector housing and the light engine housing 62. It should be appreciated that, as shown in FIG. 8, the projection lens 68 of projector 58 may be disposed adjacent the bottom of the light engine housing, rather than adjacent the top of the light engine housing.

Figure 9:
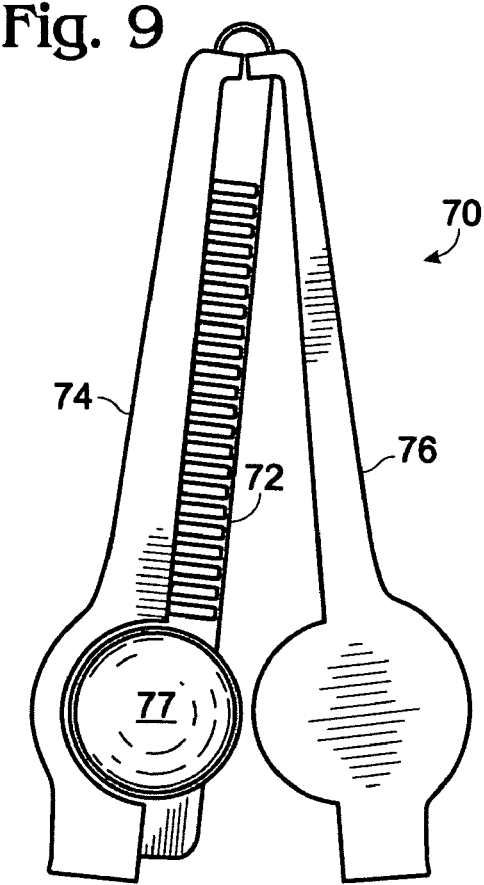
FIG. 9 depicts a portable projector according to yet another alternative embodiment of the invention in an open configuration.

Alternatively, the light engine housing may act as or be coupled to one of the first and second portions of the projector housing such that, when the projector housing is in the open configuration, the light engine housing is supported by one of the portions of the projector housing. For example, as shown in connection with projector 70 of FIG. 9, the light engine housing 72 may remain coupled to a first projector housing portion 74 when a second projector housing portion 76 is pivoted to produce an open projector housing configuration. As shown in FIG. 9, opening the projector housing exposes a projection lens 77.

Figure 10:
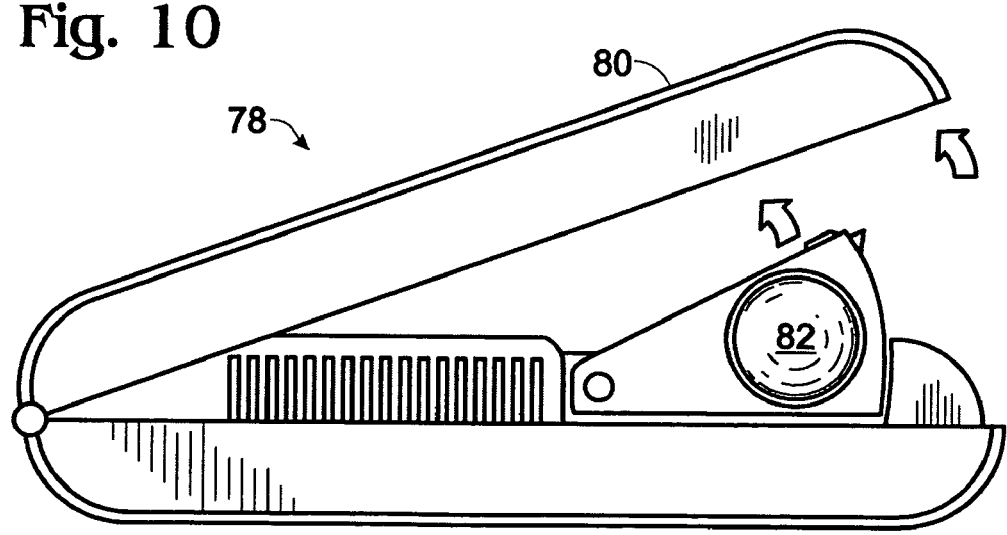
FIG. 10 depicts a portable projector according to yet another alternative embodiment of the invention in an open configuration.

Alternatively, or in addition, the projector may be configured so that the projector may be horizontally disposed when in an operative position. For example, as shown in connection with projector 78 in FIG. 10, where the projector housing is configured to support the light engine substantially horizontally. As shown, opening projector housing 80 may deploy a projection lens 82, thereby converting the light engine to an operative state. Projector 78 may be configured so that it is operative in either an upright position (as shown for projector 70 in FIG. 9) or resting horizontally, as shown.

The projector housing is not required to include a first and a second portion, but may include a single projector housing portion, or more than two projector housing portions. For example, where the projector housing has a single projector housing portion, the projector housing may be pivotally coupled to the light engine housing, such that when the projector housing is in the open configuration, the light engine is deployed. The light engine housing may be disposed horizontally, with the projector housing rotating upward into an open configuration. Alternatively, the projector housing may function as one leg of a support for the light engine, where the light engine housing forms the second leg of the support.

Figure 11:
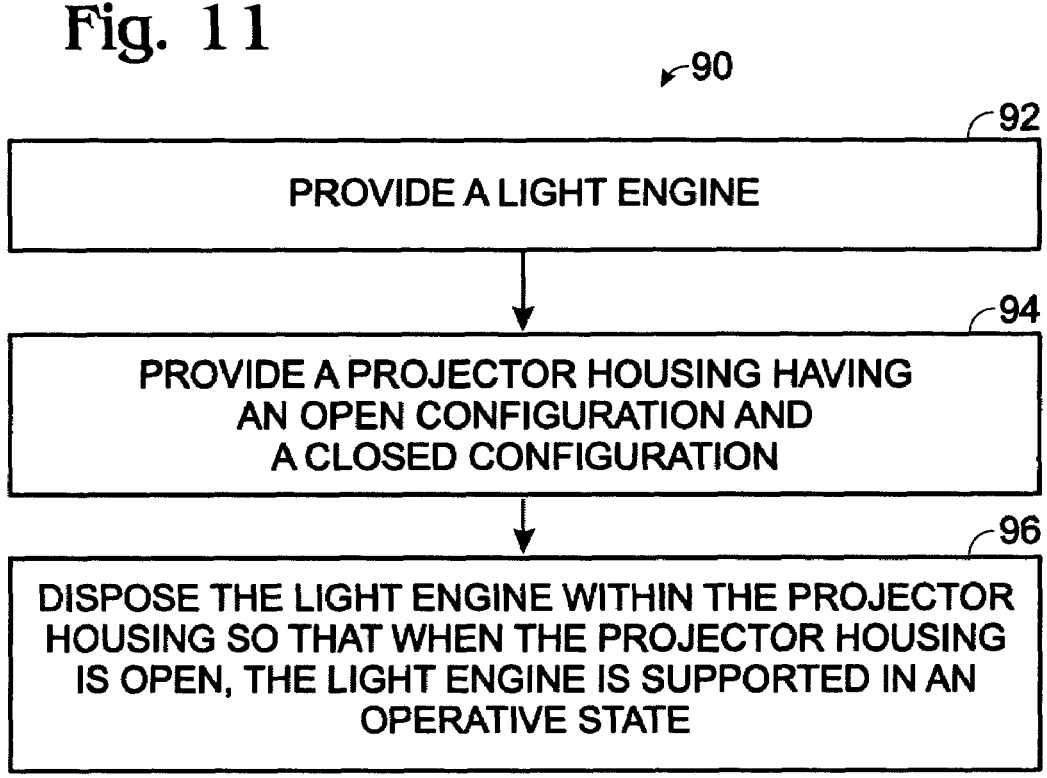
FIG. 11 is a flowchart for a method of manufacturing a portable projector, according to an embodiment of the invention.

The portable projector described herein may be manufactured as set out in flowchart 90 of FIG. 11. The illustrated method includes providing a light engine at 92, providing a projector housing having a closed configuration and an open configuration at 94, and disposing the light engine within the projector housing such that when the projector housing is in its open configuration the projector housing supports the light engine in an operative state at 96.

Figure 12:
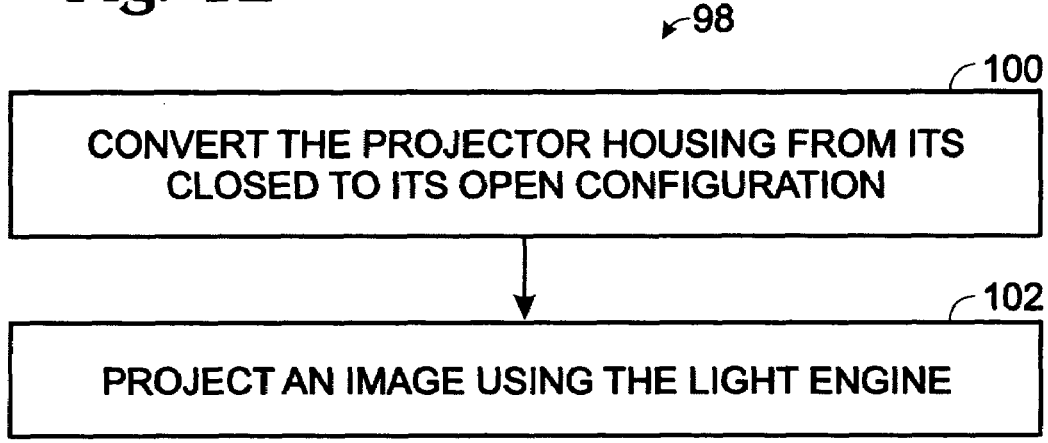
FIG. 12 is a flowchart for a method of using a portable projector, according to an embodiment of the invention.

It should be appreciated that the resulting portable projector is well-suited for use in a method of forming a projector, as set out in flowchart 98 of FIG. 12. The illustrated method includes converting the projector housing from its closed configuration to its open configuration at 100, and projecting an image using the light engine at 102.

While various alternative embodiments and arrangements of a portable projector, portable projector system, and method for forming a projected image have been shown and described above, it will be appreciated by those of skill in the art that numerous other embodiments, arrangements, and modifications are possible and are within the scope of the present disclosure. Those skilled in the art thus will understand that many variations may be made therein without departing from the spirit and scope as defined in the following claims. The present description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding two or more such elements.

What is claimed is:

1. A portable projector, comprising
   a light engine; and
   a projector housing having a first portion and a second portion that are pivotally connected, the projector housing having a closed configuration and an open configuration, wherein, in the closed configuration, the first portion and second portion at least partially enclose the light engine, and in the open configuration, the projector is supported solely by the first portion and second portion in an upright orientation with the light engine suspended from the projector housing so that it is configured to project an image onto a display surface outside the projector housing.

2. The portable projector of claim 1, wherein the light engine has a compact state and an expanded state, and wherein, in the closed configuration, the projector housing encloses the light engine in its compact state, and in the open configuration, the projector housing supports the light engine in its expanded state.

3. The portable projector of claim 2, wherein, the light engine is inoperative in its compact state, and operative in its expanded state.

4. The portable projector of claim 3, wherein the light engine includes optical components, and the optical components are configured so that when the light engine is in its expanded state, the optical components are properly aligned and oriented for operation of the light engine.

5. The portable projector of claim 1, wherein the light engine includes reflective optics.

6. The portable projector of claim 1, wherein the light engine includes polymer refractive elements.

7. The portable projector of claim 1, wherein the light engine is at least partially enclosed by a light engine housing.

8. The portable projector of claim 7, wherein when the projector housing is in the open configuration, the projector housing pivots at a top and opens at a bottom to form a support for the light engine housing.

9. The portable projector of claim 8, wherein the support is an upright support, and the light engine housing depends from the top of the projector housing.

10. The portable projector of claim 9, wherein the light engine housing pivotally depends from the projector housing.

11. The portable projector of claim 1, wherein the first and second portions of the projector housing are pivotally connected such that rotating the pivotal connection converts the closed configuration of the projector housing to the open configuration of the projector housing.

12. The portable projector of claim 11, wherein conversion of the closed configuration of the projector housing to the open configuration of the projector housing permits the light engine to be converted from a compact state to an expanded state.

13. The portable projector of claim 11, wherein at least one of the first and second portions of the projector housing remains coupled to the light engine housing when the projector housing is in the open configuration.

14. The portable projector of claim 1, wherein the projector housing includes a clamshell structure.

15. The portable projector of claim 1, wherein heat dissipation from the light engine housing is enhanced when the projector housing is in the open configuration.

16. The portable projector of claim 1, wherein the projector housing is configured to support the light engine above a surface on which the projector housing is set.

17. A portable projector, comprising
    a light engine having a compact state and an expanded state;
    a light engine housing that at least partially encloses the light engine; and
    a projector housing that includes a clamshell structure having a closed configuration and an open upright configuration, wherein the clamshell structure includes a first portion and second portion that are pivotally connected such that rotation the pivotal connection converts the closed configuration of the projector housing to the open configuration of the projector housing;
    wherein conversion of the closed configuration of the projector housing to the open upright configuration of the projector housing deploys the light engine in its expanded state so that the light engine depends from the projector housing, and wherein the light engine is configured to project an image along an axis that is generally parallel to the axis of the pivotal connection.

18. The portable projector of claim 17, wherein the light engine includes projection optics that are disposed adjacent the bottom of the light engine housing in the open configuration.

19. The portable projector of claim 17, where the light engine includes projection optics that are disposed adjacent the top of the light engine housing in the open configuration.

20. A portable projector, comprising a light engine having an inoperative compact state and an operative expanded state; and
   a projector housing having a closed configuration and an open configuration;
   wherein, conversion of the closed configuration of the projector housing to the open configuration of the projector housing deploys the light engine in its expanded operative state in a position suspended within the protector housing, so that the light engine is configured to project an image onto a display surface outside the projector housing.

21. The portable projector of claim 20, further comprising a light engine housing that at least partially encloses the light engine.

22. The portable projector of claim 21, wherein the projector housing has a first portion that is pivotally connected to the light engine housing, such that rotating the pivotal connection converts the closed configuration of the projector housing to the open configuration of the projector housing and deploys the light engine in its expanded operative state.

23. The portable projector of claim 20, wherein the light engine includes optical components, and the optical components are configured so that when the light engine is in its expanded operative state, the optical components are properly aligned and oriented for operation of the light engine.

24. The portable projector of claim 20, wherein the light engine includes reflective optics.

25. The portable projector of claim 20, wherein the light engine includes polymer refractive elements.

26. A method of using a portable projector, where the portable projector comprises a light engine; and a projector housing having a first portion and a second portion that are pivotally connected, the projector housing having a closed configuration and an open configuration; wherein in the open configuration the projector is supported solely by the first portion and second portion in an upright orientation with the light engine suspended downward from the projector housing, the method comprising:
   converting the projector housing from its closed configuration to its open configuration; and
   projecting an image onto a display surface outside the projector housing using the light engine.

27. The method of claim 26, wherein the light engine has an enclosed state and an operative state, further comprising deploying the light engine in its operative state.

28. The method of claim 26, where the light engine has a compact state and an expanded state, the method further comprising converting the light engine from the compact state to the expanded state.

29. The method of claim 26, further comprising associating the projector with a source of image data.

30. The method of claim 29, further comprising receiving image data from an image data source that is an associated computer.

31. The method of claim 30, where projecting an image includes projecting an image corresponding to the image data using the light engine.

32. The method of claim 26, wherein the first portion and second portion are pivotally connected, and converting the projector housing from its closed configuration to its open configuration includes rotating the pivotal connection.

33. A method of manufacturing a portable projector, comprising:
   providing a light engine;
   providing a projector housing having a first portion and a second portion that are pivotally connected, the projector housing having a closed configuration and an open configuration; and
   disposing the light engine within the projector housing such that when the projector housing is in its open configuration the first and second portions solely support the light engine in an operative state and in a position suspending downward from the projector housing so that it is configured to project an image onto a display surface outside the projector housing. compact state and an expanded state, and disposing the light engine within the projector housing includes configuring the light engine so that it is at least partially enclosed by the housing in its compact state.

34. The method of claim 33, wherein the light engine has a compact state and an expanded state, and disposing the light engine within the projector housing includes configuring the light engine so that it is at least partially enclosed by the housing in its compact state.

35. The method of claim 33, wherein where the first and second housing portions are configured to form a clamshell structure that at least partially encloses the light engine in the closed configuration.

36. The method of claim 33, wherein the light engine includes optical components, and disposing the light engine within the projector housing includes configuring the optical components so that when the light engine is in the deployed operative state, the optical components are aligned and oriented properly for projection of images.

37. A projector system, comprising:
   a portable projector, including a light engine having a compact state and an expanded state, and a projector housing having a clamshell structure, the clamshell having a closed configuration and an open configuration, wherein in the closed configuration the projector housing encloses the light engine, and in the open configuration the clamshell structure solely supports the light engine in an upright orientation with the light engine suspended downward from the projector housing so that it is configured to project an image onto a display surface outside the projector housing.

38. The portable projector of claim 37, wherein the light engine has a compact state and an expanded state, and wherein in the closed configuration the projector housing encloses the light engine in its compact state, and in the open configuration the projector housing supports the light engine in its expanded state.

39. The projector system of claim 37, further comprising an associated source of image data.

40. The projector system of claim 37, further comprising a display surface outside the projector housing.

41. A portable projector, comprising projection means; and
   housing means having a closed configuration and an open configuration; wherein in the closed configuration the housing means at least partially encloses the projection means, and in the open configuration the housing means supports the projection means in an operative state suspending downward within the housing means so that it is configured to project an image onto a display surface outside the projector housing.

* * * * *

UNITED STATES PATENT AND TRADEMARK OFFICE
CERTIFICATE OF CORRECTION

PATENT NO. : 7,059,732 B2 Page 1 of 1
APPLICATION NO. : 10/723235
DATED : June 13, 2006
INVENTOR(S) : Oross et al.

It is certified that error appears in the above-identified patent and that said Letters Patent is hereby corrected as shown below:

In the Claims

Col. 6 (line 51), delete "rotation" and insert therefor --rotating--.

Col. 6 (line 62), delete "adjecent" and insert therefor --adjacent--.

Col. 8 (line 12), delete "com-".

Col. 8, delete entire lines 13- 16.

Signed and Sealed this

Twenty-seventh Day of March, 2007

JON W. DUDAS
*Director of the United States Patent and Trademark Office*